United States Patent [19]

Reifenhäuser et al.

[11] Patent Number: 4,592,710

[45] Date of Patent: Jun. 3, 1986

[54] EXTRUDER PRESS UNIT FOR EXTRUDING THERMOPLASTIC MATERIAL

[75] Inventors: Hans Reifenhäuser, Troisdorf; Heinz Beisemann, Cologne; Paul Reitemeyer; Robert Grabowski, both of Troisdorf, all of Fed. Rep. of Germany

[73] Assignee: Reifenhauser GmbH & Co., Maschinenfabrik, Fed. Rep. of Germany

[21] Appl. No.: 759,053

[22] Filed: Jul. 25, 1985

[30] Foreign Application Priority Data

Jul. 28, 1984 [DE] Fed. Rep. of Germany ....... 3427912

[51] Int. Cl.$^4$ .................... B29C 47/92; H01L 41/00
[52] U.S. Cl. .................... 425/141; 264/40.1; 264/176 R; 264/555; 310/26; 310/328; 425/140
[58] Field of Search .................. 264/40.1, 40.7, 176 R, 264/555; 425/140, 141; 310/328, 26

[56] References Cited

U.S. PATENT DOCUMENTS

| | | | |
|---|---|---|---|
| 3,040,221 | 6/1962 | Fitzner | 318/573 |
| 3,940,221 | 2/1976 | Nissel | 425/141 |
| 4,016,437 | 4/1977 | Calderara et al. | 310/8.7 |
| 4,126,031 | 11/1978 | Ignashev et al. | 72/285 |
| 4,305,704 | 12/1981 | Lemelson | 425/296 |

*Primary Examiner*—Jay H. Woo
*Assistant Examiner*—Jennifer E. Cabaniss
*Attorney, Agent, or Firm*—Karl F. Ross; Herbert Dubno

[57] ABSTRACT

An extruder press unit for extrusion of a thermoplastic material has at least one output gap in an extruder body, wherein the output gap is formed by an output gap-defining adjustable extruder lip and an opposing gap-bounding lip. This output gap is adjustable with the help of a mechanical coarse adjusting mechanism to a given gap width, and the gap-defining adjustable extruder lip is connected to at least one adjusting element, to which a control and adjusting device for the thickness of the extruded material is associated. The opposing gap-bounding lip is likewise constructed as an adjustable structural component. The coarse adjusting mechanism operates on the opposing gap bounding lip. A field translator is employed as at least one of the adjusting elements and of course in the form of either a piezotransistor or a magnetrostriction translator. The control and adjusting device is set up for a fine adjustment in the range between 0.05 and 0.3 mm, preferably between 0.10 to 0.20 mm.

11 Claims, 3 Drawing Figures

EXTRUDER PRESS UNIT FOR EXTRUDING THERMOPLASTIC MATERIAL

FIELD OF THE INVENTION

Our present invention relates to extruder press units for extruding thermoplastic materials and, more particularly, to extruders having an adjustable output gap width for control and adjustment of the thickness of the extruded product plastic material.

BACKGROUND OF THE INVENTION

Extruder press units can comprise an extruder body having at least one output gap or mouth which is defined by an output gap-defining adjustable extruder lip and an opposing gap-bounding extruder lip, the output gap being adjustable with the aid of a mechanical course adjusting mechanism to a given gap width and a servomechanism is connected to the gap-defining adjustable extruder lip to regulate the thickness of the extruded plastic material. The extruder unit may be constructed as a so-called broad-slit nozzle or die for extrusion of plates and foils, or of suitable shape for extrusion of sections (structural shapes or profiles), hollow sections, pipes and tubes or for foil blowing. Commonly each extrusion press is equipped with a plurality of adjustable elements arranged in a row. The singular will continue, however, to be used herein when referring to the adjustable elements.

In the known extruder unit taught in U.S. Pat. No. 3,040,221, for example which is constructed as a broad-slit nozzle, the adjustable element is constructed as a metal bolt, whose head has a thread and is screwed in a corresponding hole of the extruder body, whose shaft however is heatable by resistive electric heating of an appropriate heating element.

Its thermal expansion determines the gap size adjustment of the adjusting element associated with the control and adjusting device, which permits fine control and adjustment.

The coarse adjustment takes place in a complicated way by screwing the head provided with the thread into the associated hole and cannot be effected free of consideration of the allowed tolerances.

The coarse adjustment and the fine adjustment are therefore coupled in that the allowed variation of the coarse adjustment influences the precision of the fine adjustment because the heating element is part of the control and adjusting device. In practice the bolt shaft is adjusted to a temperature within a particular temperature range and is held at this temperature, until the control and adjustment requires another gap adjustment and therefore requires another temperature of the bolt shaft.

This system has several drawbacks. On the one hand for physical reasons the temperature rise of the bolt shaft occurs only slowly, so that for control and adjustment a lengthy adjusting element equilibration time with its known disadvantages must be tolerated or taken into account.

On the other hand unavoidable temperature inhomogeneities of the bolt shaft impair the precision of this control and adjustment, chiefly because the extruder is heated as a whole and thus control and adjustment fluctuations result from thermal coupling.

OBJECTS OF THE INVENTION

It is an object of our invention to provide an improved extruder press unit obviating the drawbacks of earlier devices.

It is a further object of our invention to provide an extruder press unit having an improved precision and accuracy of operation, wherein extruded plastic products can be produced to more exacting tolerances than those of the prior art.

It is yet another object of our invention to produce an extruder press unit having an improved precision and accuracy of operation, but which is not unduly slowed by adjusting elements which do not equilibrate rapidly.

SUMMARY OF THE INVENTION

These objects and others which will become apparent hereinafter are attained in accordance with our invention in an extruder press unit for extrusion of thermoplastic materials comprising an extruder body having at least one output gap through which extruded product flows or is forced which is defined by an output gap-defining adjustable extruder lip and an opposing gap-bounding lip, whereby the output gap in the extruder body is adjustable to a specified gap width with the aid of a coarse adjusting mechanism, and the output gap-defining adjustable extruder lip is connected to at least one adjusting element to which a control and adjusting device (e.g. a servocontroller or feedback system) for adjusting the thickness of the extruded plastic product is associated.

According to our invention the opposing gap-bounding lip likewise is constructed as an adjustable lip and the coarse adjusting mechanism operates on this opposing gap-bounding lip, at least one field translator is employed as the adjusting element, and the control and adjusting device is set up for a fine gap size adjustment from 0.050 to 0.30 mm, preferably from 0.10 to 0.20 mm.

Our invention is based upon our conclusion that for the purpose of holding the plastic product to exact thickness tolerances, the coarse and fine adjustments must be decoupled.

Therefore the opposing gap-defining lip according to our invention is likewise constructed as an adjustable structural component, so that the coarse adjusting mechanism can work on this opposing gap-bounding lip.

This decoupling moreover allows the use of a field translator as the adjusting element or one of the adjusting elements, which operates without an equilibration time and with a very high precision.

A field translator is a body whose dimension is changed to effect linear displacement by the application of an electromagnetic field thereto by reason of a property of the material from which the body is made.

Field translators have been used in other fields and include piezotranslators and magnetostriction translators, i.e. piezoelectric and magnetostrictive bodies. The former operates with the known piezoelectric effect, and of course the latter with the likewise known magnetostriction effect.

The adjusting member is an electrically controllable element which, without rotating parts, changes its dimensions by using only the above named effects.

Thus the voltage supplied from the outside can change the length of a piezotranslator by from about a fraction of a micrometer to about a millimeter. The maximum extension and the force, which a piezotranslator can take, are independent of the structure of the elements and easily optimized.

The resolution of a piezotranslator in regard to a path change is theoretically unlimited and depends only on the parameters of the supplied voltage. Every voltage change is directly and with minimum loss transformed into a linear motion, as is the case in magnetostriction translation.

Preferably our invention operates with piezotranslation.

The combination of a field translator as adjusting element for the output gap-defining adjustable extruder lip in conjunction with a coarse adjusting element, by uncoupling the coarse and fine adjustments, allows the thermoplastic material to be extruded to very exacting tolerances, particularly in regard to thickness.

In a preferred specific embodiment of our invention, which makes it possible to effect the coarse adjustment of the gap size in a particularly easy way, the opposing gap-bounding extruder lip is connected by an elastically deformable lip connecting member to the extruder body, and is coarsely adjustable against the elastic restoring force of intrinsic deformation of the connecting web.

The coarse adjusting mechanism has at least one coarse adjusting path rod supported in the extruder body, which is displaceable by means of an eccentric driver.

The adjustment of the opposing gap-bounding lip occurs simultaneously and generally uniformly over the entire work tool, i.e. extruder, width.

Correspondingly the field translator can work on the output gap-defining adjustable extruder lip, which is connected by a respective intrinsically deformable connecting member and is adjustable against an eleastic restoring force. The field translator itself is suitably positioned in a heat-insulated translator chamber of the extruder body, from which the field translator push rod, which operates on the output gap-defining adjustable extruder lip is fed.

The field translator can additionally be cooled.

When thermoplastic extrusions of considerable width are produced, we divide the output gap-defining adjustable extruder lip into segments each of which is associated with a respective field translator.

This approach can also be used for the opposing gap-bounding lip wherein for example on the individual segments of the opposing gap-bounding lip a respective push rod operates, the push rod being operable by a common eccentric driver.

For the manufacture of round sections or sections with rounded edges, we can divide the output gap-defining adjustable extruder lip into sectors and associate these sectors individually with respective field translators.

The coarse adjustment can be effected in the extruder press unit of our invention manually. It is then easy to perform the entire coarse adjustment when a single eccentric adjusting driver is used.

According to a preferred embodiment of our invention, however, the eccentric adjusting driver is connected with an adjusting motor, which is associated with the control and adjusting device. The design is such that the control and adjusting device serves for control and regulation of gap size changes between 0.05 and 0.30 mm using the field translator and for larger gap size changes operates the adjusting motor and thus the coarse adjusting mechanism.

The control and adjusting device is suitably connected to a thickness measuring device with a measuring head, which is positioned in the vicinity of the already dimensionally stable plastic product, that is, behind the "freezing" line or below the congealing temperature. This produces the desired result but to much more exacting tolerances, particularly as to the thickness of the extruded plastic product. It is understood that the field translator acts directly or by interposing of a mechanical transmission unit, for example a lever mechanism, on the associated output gap-defining adjustable extruder lip.

BRIEF DESCRIPTION OF THE DRAWING

The above and other objects, features, and advantages of our invention will become more readily apparent from the following description, reference being made to the accompanying highy diagrammatic drawing in which.

SPECIFIC DESCRIPTION

Figure 1:
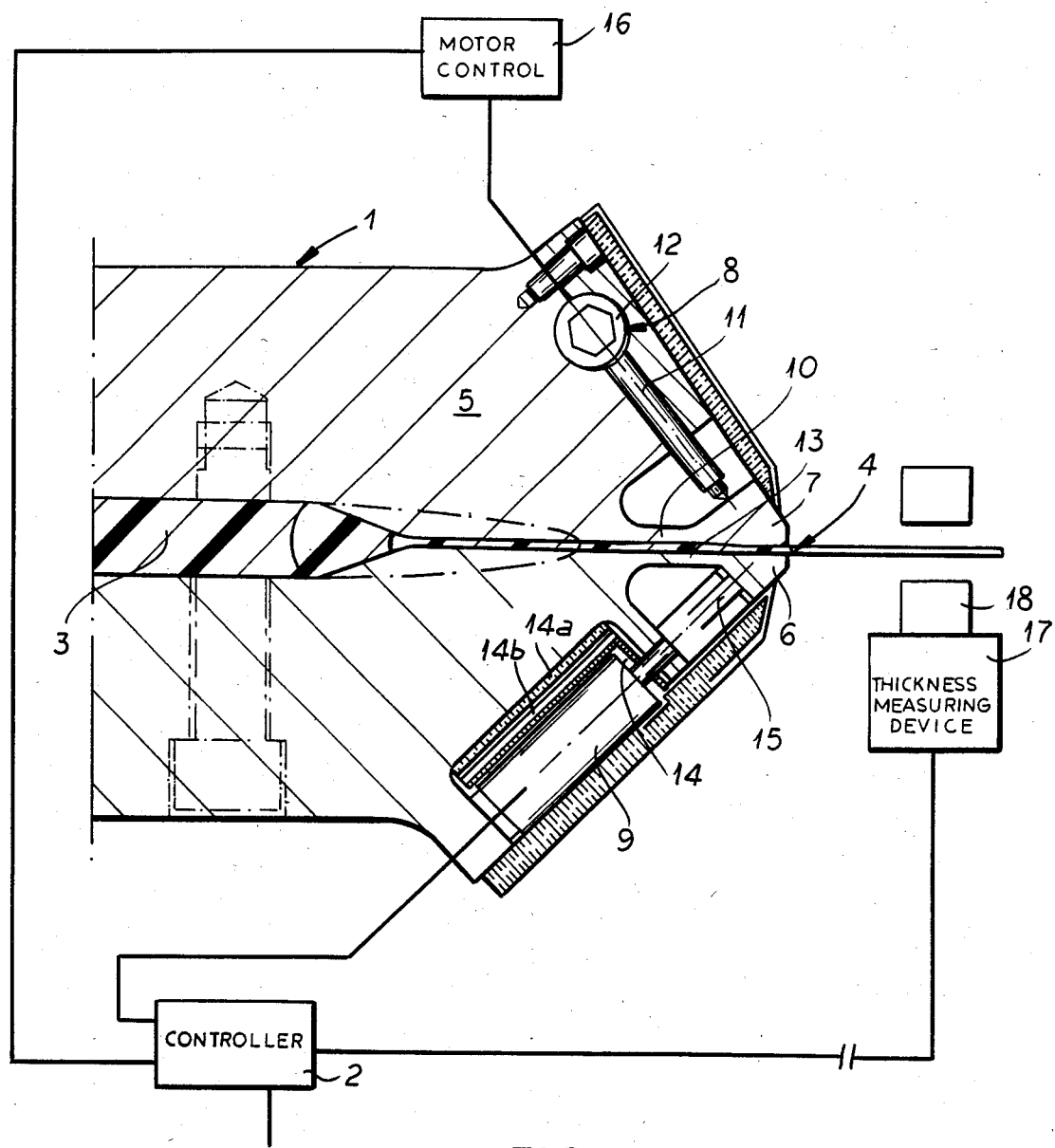
FIG. 1 is a partially cutaway, vertical cross sectional, schematic view of a preferred embodiment of the extruder press unit of our invention showing the extruder with its control and adjustment device and piezotranslator.
Figure 2:
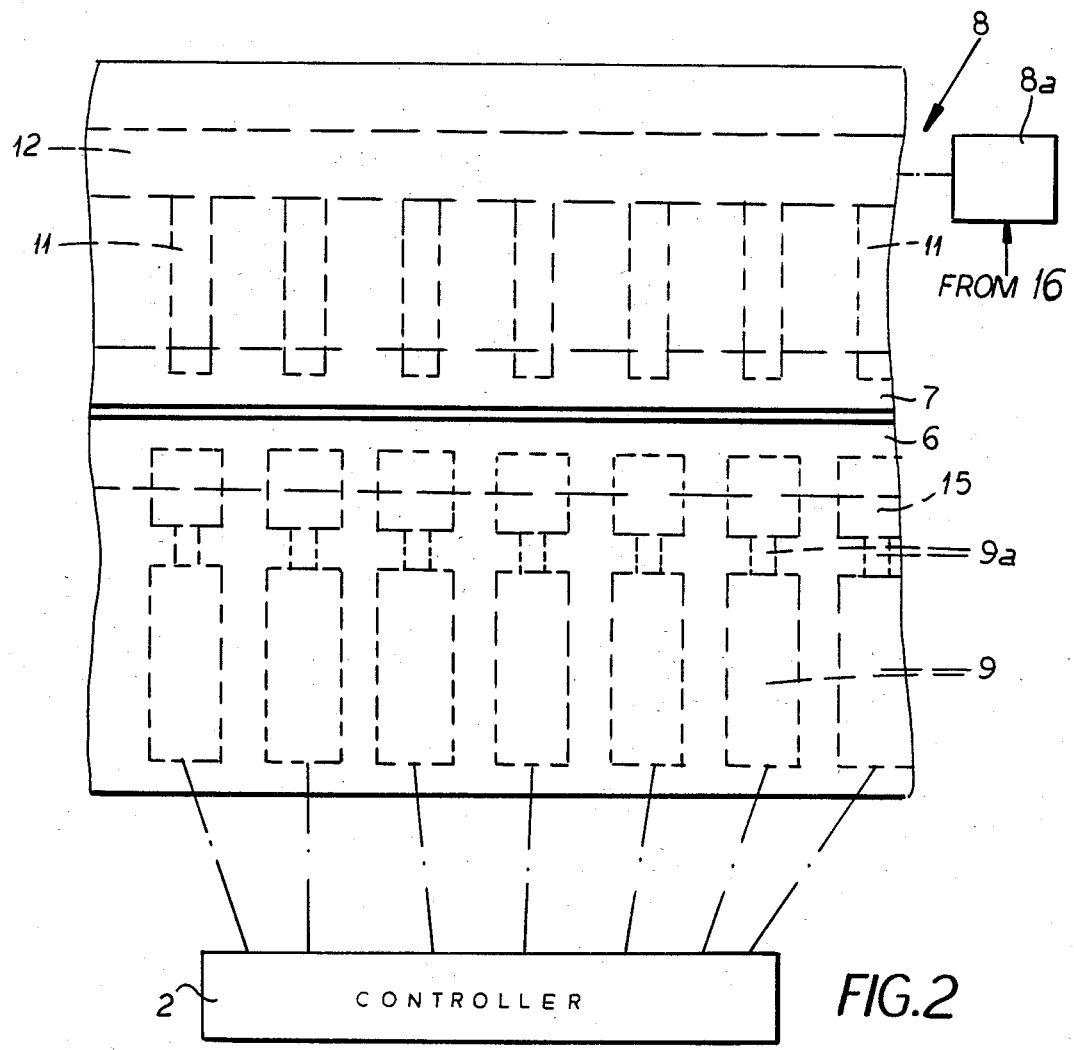
FIG. 2 is a front view of the extruder press unit according to the embodiment of FIG. 1.

The extruder press shown in FIGS. 1 and 2 comprises an extruder 1 and the control and adjusting device or servomechanism 2. It is constructed and adjusted for extrusion of thermoplastic material, for example a sheet of thermoplastic synthetic resin. Included in the basic structure of the extruder press unit are first an extruder 1 shown partially cutaway with an output gap or mouth 4 in an extruder body 5, which has an output gap-defining adjustable extruder lip 6 and an opposing gap-bounding lip 7. The output gap 4 is adjustable to a given gap width with the aid of a mechanical coarse gap adjusting mechanism 8. The output gap-defining adjustable extruder lip 6 is connected to at least one fine gap adjusting element 9 of the field translator type, which is associated with a control and adjusting device 2 for regulating the thickness of the extruded plastic material.

The opposing gap-bounding lip 7 is likewise formed as an adjustable component and the coarse gap adjusting mechanism operates on the opposing gap-bounding lip 7. As a fine gap adjusting element 9 a peizotranslator is preferably used and the component configuration so set up that the control and adjusting device 2 is equipped for a fine adjustment with a gap size regulating capability of between 0.05 and 0.30 mm, preferably from 0.10 to 0.20 mm.

The opposing gap-bounding lip 7 is connected by an elastically deformable bounding lip connecting member 10 to the extruder body 5 and is coarsely adjustable against the intrinsic elastic restoring force thereof. The coarse gap adjusting mechanism has at least one coarse adjusting push rod 11 in the extruder body 5, which is operable by means of an eccentric adjustable driver 12. Similarly the piezotranslator 9 has a rod 9a which operates on the extruder lip 6, which is connected to the extruder body 5 by an elastic deformable extruder lip connecting member 13 and is adjustable against the intrinsic elastic restoring force thereof.

The piezotranslator 9 is positioned in a piezotranslator chamber 14 of the extruder body 5, which is insulated at 14a in regard to heat flow, from which a field translator ram 15 of the piezotranslator 9 extends and which acts on the output gap-defining adjustable extruder lip 6. The piezotranslator chamber 14 can additionally be cooled e.g. by the circulation of coolant through cooling passages 14b.

For the manufacture of flat sections of considerable width, the output gap-defining adjustable extruder lip 6, can be divided into segments in the direction perpendicular to the plane of FIG. 1, whereby the segments individually are acted upon by respective piezotranslators 9 as seen in FIG. 2.

That also can apply for the manufacture of circular sections or of sections with rounded edges, whereby correspondingly the output gap-defining adjustable extruder lip 6 can be divided into sectors and these sectors individually are connected to a piezotranslator 9. The opposing bounding lip 7 can also be similarly divided with individual rods 11 all simultaneously displaced by the eccentric 12.

The eccentric adjusting driver 12 is also connected to a control motor 16 for the motor 8a operating eccentric 12, the motor control 16 receiving an input from the controller 2. The control and adjusting device 2 serves for control and adjusting of the gap size in the range from 0.050 to 0.3 mm by the piezotranslator 9; for a greater gap size adjustment the coarse adjusting mechanism 8 is operated.

The control and adjusting device 2 is connected to a thickness measuring device 17 with a measuring head 18, which is located downstream of the freezing point or line of the material so that the thickness is measured on the congealed material.

Figure 3:
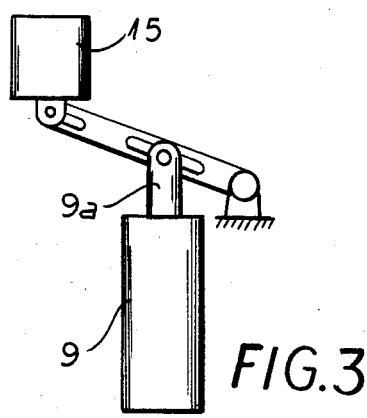
FIG. 3 is a diagram of a lever mechanism which can be used with a field translator.

FIG. 3 shows that the field translators 9, instead of acting directly upon the deflectible lip 6 can have their rods 9a engaged with a force or motion transmission, e.g. a lever 9b pivotally connected between a bearing element 15 and a point on the extruder-head body.

The controller 2 acts as in conventional servomechanisms to receive the input from measuring heat 18 and compare it with a set point value of the thickness. An error or difference signal is sent selectively to the motor control 16 if the error represents a deviation greater than 0.3 mm and to the field translators 9 if it represents a deviation between say 0.05 and 0.3 mm.

We claim:

1. In an extruder press unit for extrusion of thermoplastic materials comprising an extruder body having at least one output gap, which is defined by an output gap-defining adjustable extruder lip and an opposing gap-bounding lip, whereby said output gap in said extruder body is adjustable to a specified gap width with the aid of a coarse adjusting mechanism and said output gap-defining adjustable extruder lip is connected to at least one adjusting element, to which a control and adjusting device for regulating the thickness of the extruded plastic product is associated, the improvement wherein
    said opposing gap-bounding lip is constructed as an adjustable component on said body;
    said coarse adjusting mechanism operates on said opposing gap-bounding lip;
    said adjusing element is a field translator; and
    said control and adjusting device is designed for a fine gap size adjustment of between 0.05 and 0.3 mm of said field translator.

2. The improvement according to claim 1 wherein said control and adjusting device is constructed and arranged for a fine gap size adjustment of between 0.10 and 0.20 mm.

3. The improvement according to claim 1 wherein said opposing gap-bounding lip is connected to said extruder body by an elastic deformable opposing lip connecting member and is coarsely adjustable against an intrinsic elastic restoring force of said member and that said coarse adjusting mechanism has at least one coarse adjusting push rod supported in said extruder body, which is displaceable by an eccentric adjustable driver.

4. The improvement according to claim 3 wherein said field translator acts upon said output gap-defining adjustable extruder lip, said extruder lip being connected by an elastically deformable extruder lip connecting member to said extruder body and is adjustable against an intrinsic elastic restoring force of said extruder lip.

5. The improvement according to claim 4 wherein said field translator is positioned in a heat insulated translator chamber of said extruder body, from which a field translator push rod extends.

6. The improvement according to claim 5, further comprising means for cooling said field translator chamber.

7. The improvement according to claim 6 wherein said output gap-defining adjustable extruder lip has a plurality of segments each acted upon by a respective one of said field translator.

8. The improvement according to claim 7 wherein said output gap-defining adjustable extruder lip has a bow-like shape, and is divided into said plurality of said segments, and each of said individual segments is acted upon by a respective one of said field translators.

9. The improvement according to claim 3 wherein said eccentric adjustable driver is connected to an adjusting motor, which is associated with said control and adjusting device.

10. The improvement according to claim 1 wherein said control and adjusting device for control and regulation of said gap size from 0.050 to 0.30 mm acts upon said field translator and for larger gap size changes acts on said coarse adjusting mechanism.

11. The improvement according to claim 1 wherein said control and adjusting device is connected to a thickness measuring device with a measuring head, which is positioned in a region at which the plastic product has congealed.

* * * * *